United States Patent [19]

Mao et al.

[11] Patent Number: 5,531,920
[45] Date of Patent: Jul. 2, 1996

[54] METHOD OF SYNTHESIZING ALKALINE METAL INTERCALATION MATERIALS FOR ELECTROCHEMICAL CELLS

[75] Inventors: Zhenhau Mao, Coral Springs; Dee Newton, Sunrise, both of Fla.

[73] Assignee: Motorola, Inc., Schaumburg, Ill.

[21] Appl. No.: 315,782

[22] Filed: Oct. 3, 1994

[51] Int. Cl.$^6$ .................................................. H01M 4/88
[52] U.S. Cl. ...................... 252/182.1; 429/218; 429/221; 429/223; 429/224
[58] Field of Search ..................... 252/182.1; 429/218, 429/221, 223, 224

[56] References Cited

U.S. PATENT DOCUMENTS

| | | | |
|---|---|---|---|
| 5,264,201 | 11/1993 | Dahn et al. | 429/218 |
| 5,378,560 | 1/1995 | Tomiyama | 429/217 |
| 5,478,672 | 12/1995 | Mitate . | |

FOREIGN PATENT DOCUMENTS

| | | |
|---|---|---|
| 556555 | 1/1993 | European Pat. Off. . |
| 6044971 | 2/1994 | Japan . |

OTHER PUBLICATIONS

Understand the Disordered Structure of $LiMnO_2$ Prepared at Low Temperatures, Reimers, et al, Dept. of Physics, Simon Fraser University, Burnaby, B.C. Canada V5A 1S6.

Improved Capacity Retention in Rechargeable 4V lithium/lithium–manganese oxide (spinel) cells, Gummow, et al, Div. of Materials Science, Jan. 20, 194. Elsevier, Solid State Ionics 69 (1994) 59–67.

Lithium Batteries: New Materials, Development & Perspectives, C. Pistoia, Elservier, New York (1994).

Lithium Batteries: New Materials, Developments & Perspectives, Industrial Chemistry Library, vol. 5, pp. 417–456.

Preparation of High Surface Area EMD and 3–Volt Cathode of Manganese Oxides, M. Yoshio, IBA New Orleans Mtg. Oct. 9, 1993.

Ohzuku et al. J. Electrochem Soc 140 (7) 1993 1862–1870.
Ohzuku et al. Chemistry Express 6 (3) 1991 161–164.
Ohzuku et al. Chemistry Express 5 (10) 1990 733–736.

Primary Examiner—Charles T. Jordan
Assistant Examiner—John R. Handee
Attorney, Agent, or Firm—Kenneth M. Massaroni

[57] ABSTRACT

A method for preparing an alkaline metal transition metal oxide charge storage material for electrochemical cells. The material may be used in a lithium rechargeable electrochemical cell along with a conventional lithium intercalation electrode. The material may be prepared by providing a transition metal hydroxide and reacting it with a alkaline metal containing oxidizing agent. The ratio of the transition metal to the alkaline metal should be approximately 0.5:1 to 1.2:1.

5 Claims, 5 Drawing Sheets

5,531,920

METHOD OF SYNTHESIZING ALKALINE METAL INTERCALATION MATERIALS FOR ELECTROCHEMICAL CELLS

TECHNICAL FIELD

This invention relates in general to the field of electrodes for electrochemical cells, and in particular to methods of synthesizing said electrodes.

BACKGROUND OF THE INVENTION

Numerous first transition metal oxide materials have been intensively investigated during the past decade for use as the positive electrode in rechargeable lithium batteries. These materials which may be classified as either lithiated or unlithiated metal oxides have been investigated because of their high gravimetric energy density.

Unlithiated first transition metal oxides include compounds such as $V_2O_5$, $V_6O_{13}$, $TiO_2$ and $MnO_2$. These materials may be coupled with negative materials to form an energy storage device such as a battery. The negative materials are limited, however, to active lithium containing materials such as metallic lithium and/or lithium alloys. Unfortunately, lithium and lithium alloys are not preferred for many applications because of their volatility in ambient conditions. Further, lithium poses many difficulties for electrode material processing and cell fabrication, since all the processes must be carried out in an inert environment.

Lithiated first transition metal oxides such as $LiCoO_2$, $LiMn_2O_4$, and $LiNiO_2$, are positive electrode materials. These materials may be coupled with a negative electrode material to form a battery. Preferred negative electrode materials include metals such as Al, Bi, and Cd, and a lithium intercalation materials such as graphite. Metallic lithium and/or lithium alloys are not required as in unlithiated transition metal oxides. Accordingly, both the positive and negative electrodes can be processed and fabricated without inert environments. Therefore, lithiated metal oxides are more desirable as the positive material than unlithiated metal oxides.

Among lithiated first transition metal oxides, $LiMn_2O_4$ is most attractive because it is least expensive, and is environmentally benign. Unfortunately, the gravimetric capacity of $LiMn_2O_4$ is quite small having a theoretical capacity of only 148 mAh/g, and a practical capacity of typically less than about 120 mAh/g. Further, the high charge voltage necessary for materials such as $LiMn_2O_4$ is near the potential at which electrolyte decomposition occurs. Accordingly, a slight overcharge may result in a significant electrolyte decomposition, and hence a significant decrease in battery performance.

Lithiated high capacity manganese oxides have been known for a number of years. For example, $Li_2O$ stabilized, gamma—$MnO_2$ can be electrochemically lithiated to form rechargeable $LiMnO_2$ (as in the case of an unlithiated $MnO_2$ discharged in a battery). This process is described in a pair of papers entitled "Preparation of High Surface Area EMD and Three-Volt Cathode of Manganese Oxide," by M. Yoshio presented at the IBA New Orleans Meeting of Oct. 9–10, 1993; and "Commercial Cells Based on $MnO_2$ and $MnO_2$-Related Cathodes", by T. Nohma et al, in a publication entitled *Lithium Batteries*, edited by G. Pistoia, and published by Elsevier Press. These materials have been demonstrated to have a rechargeable capacity greater than 200 mAh/g at potentials higher than 2.5 volts but lower than 4 volts. Unfortunately, unlithiated manganese oxides as the positive material are less attractive than lithiated manganese oxides, as discussed earlier. Further, electrochemical lithiation as described in these papers is economically unfeasible at an industrial scale. Therefore, a chemical process for synthesis of a low voltage, high capacity lithiated manganese oxide is highly desirable. A lithiated three-volt manganese oxide which has the formula $LiMnO_2$ is highly desirable as it possesses the advantages of both the existing four and three-volt manganese oxide. Such a material, prepared by an ion exchange method, was described by Ohzuku, et al in a publication entitled *Chemistry Express*, 7, 193 (1992). This material has been commented on extensively in subsequent papers such as the M. Yoshio paper referenced above, and in a publication entitled "Understanding the Disordered Structure $LiMnO_2$ Prepared at Low Temperatures" by Reimers, et al. and appearing in the Journal *Chemical Physics*.

Unfortunately, the ion-exchange process described by Ohzuku, et al is both inefficient and does not lead to reproducible results, as the authors themselves acknowledge. Moreover, the ion-exchange process is not readily conducive to industrial scale manufacturing in commercial quantities.

Accordingly, there exists a need for a simple method by which to manufacture lithiated manganese oxide materials, such as $LiMnO_2$. The manufacturing process should be relatively simple, take advantage of low-cost materials, and assure high repeatability and reproducibility of material characteristics fabricated accordingly to the process.

DETAILED DESCRIPTION OF THE PREFERRED EMBODIMENT

Figure 1:
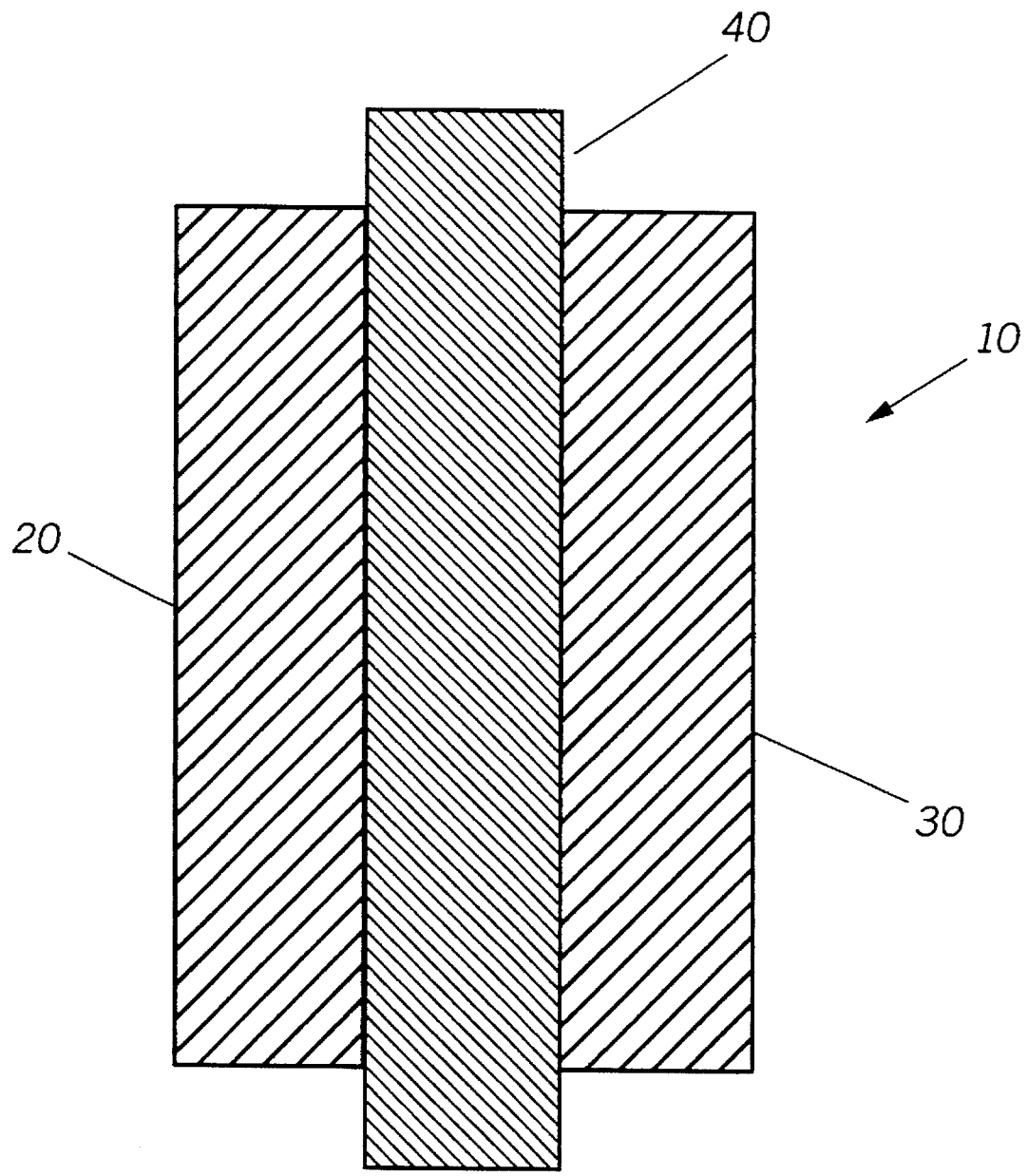
FIG. 1 is a schematic representation of an electrochemical cell including a lithiated transition metal oxide electrode in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell (10) including a lithiated first transition metal oxide in accordance with the instant invention. The electrochemical cell includes a positive electrode (20) and a negative electrode (30) and has an electrolyte (40) disposed therebetween. The cell positive electrode (20) is fabricated of a three-volt alkaline metal transition metal oxide charge storage material such as that described in greater detail hereinbelow. The negative electrode (30) of the cell (10) may be fabricated from a lithium alloying metal such as Al, Bi, Cd, or a lithium intercalation material such as carbon, graphite, and other such materials as are known in the art. Thus, the instant invention allows the electrochemical cell to be assembled without relying upon a metallic lithium or lithium alloy negative electrode.

The electrolyte (40) disposed between the electrode may be any of the electrolytes known in the art including for example, $LiClO_4$ in propylene carbonate or polyethylene oxide impregnated with a lithiated salt. The electrolyte (40) may also act as a separator between the positive and negative electrodes.

In accordance with the instant invention, there is provided a method for synthesizing an alkaline transition metal oxide material which is capable of storing and discharging electrical charge. The material disclosed herein is therefore useful as, for example, a cathode in lithium rechargeable batteries. The charge storage material has the formula $A_xTmO_2$ where A is an alkaline metal selected from the group of lithium, sodium, potassium, and combinations thereof; Tm is a first transition metal selected from the group of titanium, vanadium, manganese, chromium, iron, nickel, cobalt and combinations thereof; and x is between 0.5 and 1.2.

Figure 2:
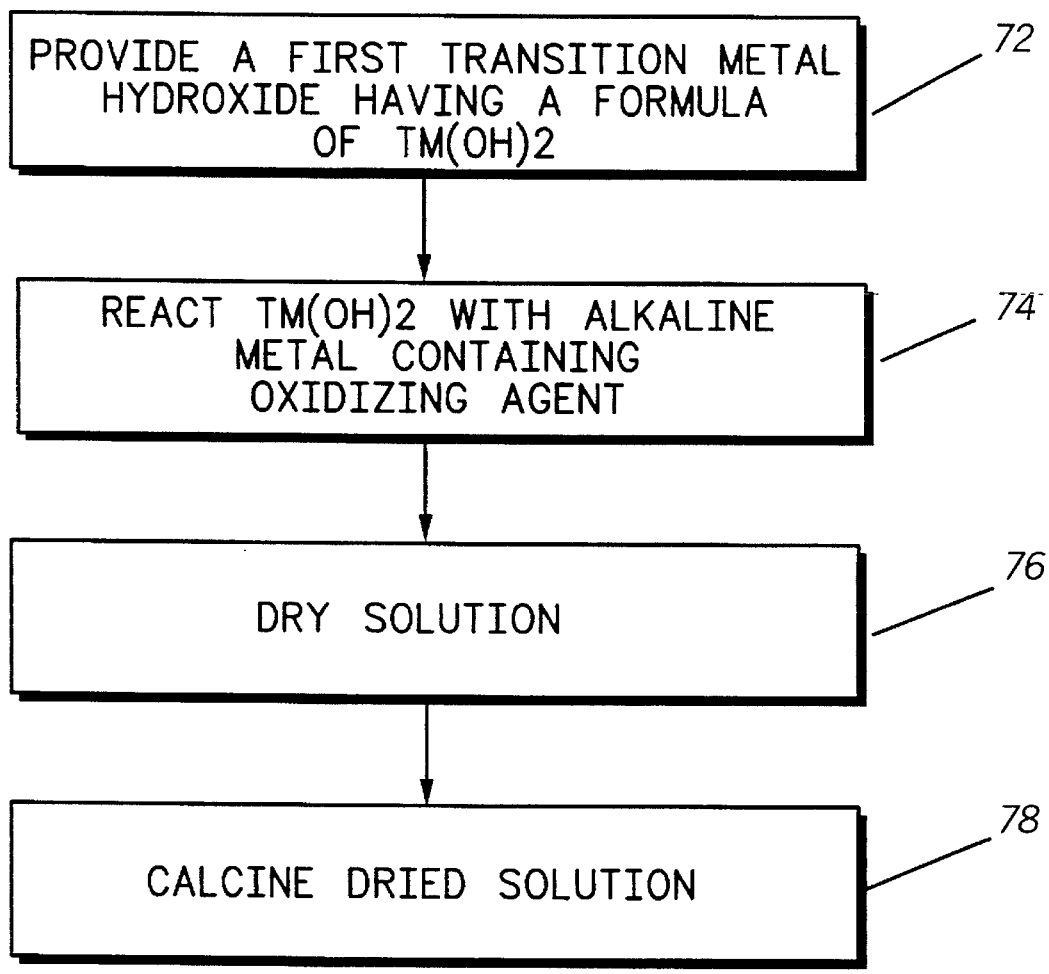
FIG. 2 is a flow chart illustrating the steps for preparing a lithiated transition metal oxide material in accordance with the instant invention.

Referring now to FIG. 2, there is illustrated therein a flow chart describing the steps for preparing the alkaline metal transition metal oxide in accordance with the instant invention. The first step illustrated in the flow chart (70) is disclosed in box (72) and includes the step of providing a first transition metal hydroxide of the formula $Tm(OH)_2$. In one preferred embodiment of the instant invention, the transition metal is provided in the 2+ oxidation state. Further, the transition metal may preferably be manganese. Typically, the transition metal hydroxide must be fleshly prepared as such materials are not typically stable in air and may be easily decomposed into other products. For example, manganese hydroxide, $Mn(OH)_2$ will easily decompose into MnO and $H_2O$ or be oxidized by $O_2$ in the air into $Mn_2O_3$. $Mn(OH)_2$ may be prepared from a manganese containing salt such as $Mn(NO_3)_2$, $MnSO_4$, $MnCO_3$, $Mn(CH_3CO_2)_2$, and combinations thereof, in an inert environment by preparing a desired amount of, for example, $Mn(NO_3)_2$ dissolved in deionized water purged with nitrogen gas. Thereafter, an alkaline metal hydroxide solution, such as LiOH, NaOH, KOH, or others, is added to the manganese containing salt described above, so that the manganese and lithium are present in a ration of 1:2. Adding the alkaline metal hydroxide causes a $Mn(OH)_2$ precipitate to form. The solution has a pH of approximately 10. Thereafter, the precipitate is filtered in an inert environment and dried under vacuum.

Returning to FIG. 2, the second step in the fabrication of the alkaline metal transition metal oxide charge storage material is illustrated in box (74) thereof. The second step includes reacting the transition metal hydroxide material with a alkaline metal-containing oxidizing agent, or a mixture of an alkaline metal-containing salt and an oxidizing agent to form a mixture. The alkaline metal-containing oxidizing agent may contain an alkaline metal selected from the group of lithium, sodium, potassium, and combinations thereof. Exemplary materials which may be used as the alkaline metal containing oxidizing agent include lithium peroxide ($Li_2O_2$), lithium nitrate ($LiNO_3$), $LiClO_4$, $Na_2O_2$, $K_2O_2$, and combinations thereof.

The transition metal hydroxide and the alkaline metal containing oxidizing agent should be mixed so that the ratio of transition metal to alkaline metal is between 0.5:1 and 1.2:1. The mixing is preferably carried out in the presence of an organic solvent having a relatively low boiling point. Examples of such a solvents include acetone, acetonitrile, and tetrahydrofuran to name a few. After thorough mixing, the organic solvent may be removed, yielding a powdered alkaline metal, transition metal oxide. The resulting mixture may thereafter be dried in an inert environment for several hours. This step is illustrated in Box 76 of FIG. 2. The materials may optionally be calcined at temperatures of up to 800° C. for several hours in an inert gas environment, as illustrated in box 78 of FIG. 2.

The invention may be better understood from the examples presented below.

EXAMPLES

Example I

A first sample of the alkaline metal transition metal, oxide charge storage material was made according to the instant invention. The starting transition metal hydroxide was manganese hydroxide $Mn(OH)_2$. Lithium peroxide $Li_2O_2$ was employed as the alkaline metal containing oxidizing agent. Manganese hydroxide was prepared by dissolving 18 grams of $Mn(NO_3)_2.6\ H_2O$ in 200 milliliters of deionized water purged with nitrogen gas. Thereafter, a 1M solution of lithium hydroxide (LiOH) was added to the manganese containing solution. The ratio of manganese to lithium in the solution was approximately 1:2. The solution so formed provided an $Mn(OH)_2$ precipitate. The $Mn(OH)_2$ was filtered from the solution in an inert environment. The precipitate was then dried under vacuum. The precipitate was then thoroughly mixed with 1.4 g of lithium peroxide. The ratio of manganese to lithium in this second mixture was approximately 1:1. Mixing took place in a ball mill mixer in the presence of 60 ml of tetrahydrofuran (THF). The mixture was then dried further and heated to 450° C. in an nitrogen atmosphere for a period of 30 hours.

The resulting powder had the composition of $LiMnO_2$. A mixture of the $LiMnO_2$ powder along with graphite powder (10 wt/%) and PTFE (Teflon), powder (5 wt/%) was fabricated into a thin sheet via conventional processes. A 1 cm² sample having a thickness of approximately 60 μm was cut from the sheet and tested as the positive lithium intercalation electrode in a test cell. The test cell further included a glass mat as the separator and a lithium foil as the negative electrode. The electrolyte was 1M $LiPF_6$ in a solution of 50% ethylene carbonate and 50% dimethyl carbonate. Tests were carried out at ambient temperatures (approximately 22° C.).

Figure 3:
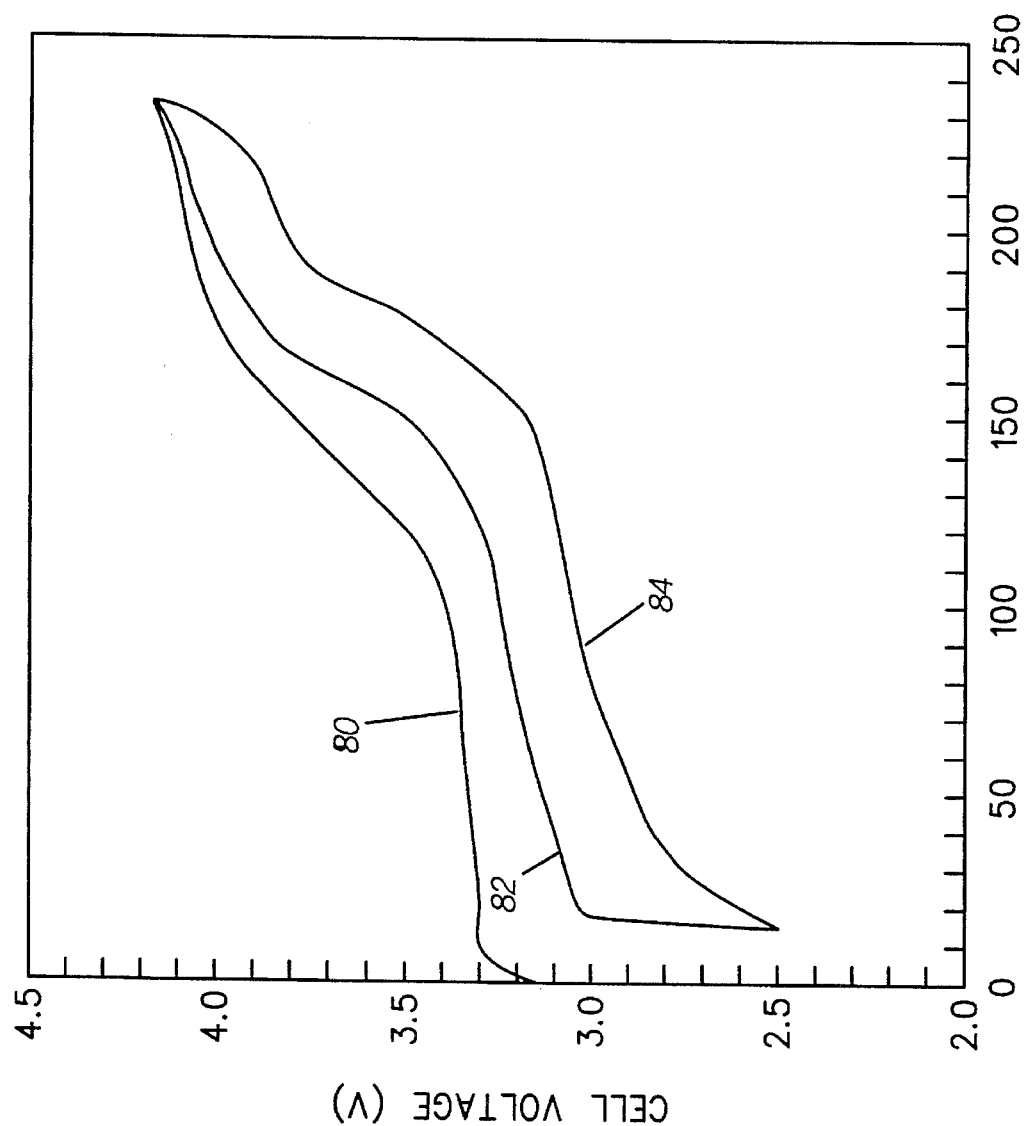
FIG. 3 is a charge and discharge profile for a $LiMnO_2$ electrode vs. lithium, fabricated in accordance with the instant invention.

Referring now to FIG. 3, there is illustrated therein a typical charge/discharge profile of cell voltage for the sample described above. The first charge profile (as the material is fabricated in an uncharged condition) is shown on line 80, the first discharge on line 82, and the second charge on line 84. It may be appreciated that a capacity as high as approximately 210 mAh/g has been obtained. It is hypothesized that since $Li_2O_2$ partially decomposes into $Li_2O$ and $O_2$ during mixing with $Mn(OH)_2$ and thus the reaction between $Li_2O_2$ and $Mn(OH)_2$ may not be complete. Thus, the original product obtained contains some amounts of electrochemically inactive materials such as $Li_2O$ and MnO. When these electrochemically inactive materials are removed by conventional washing methods, the capacity of the material is expected to exceed 210 mAh/g. FIG. 3 shows that high capacities may be achieved in materials fabricated by this method, and further that the materials may be repeatably cycled.

Figure 4:
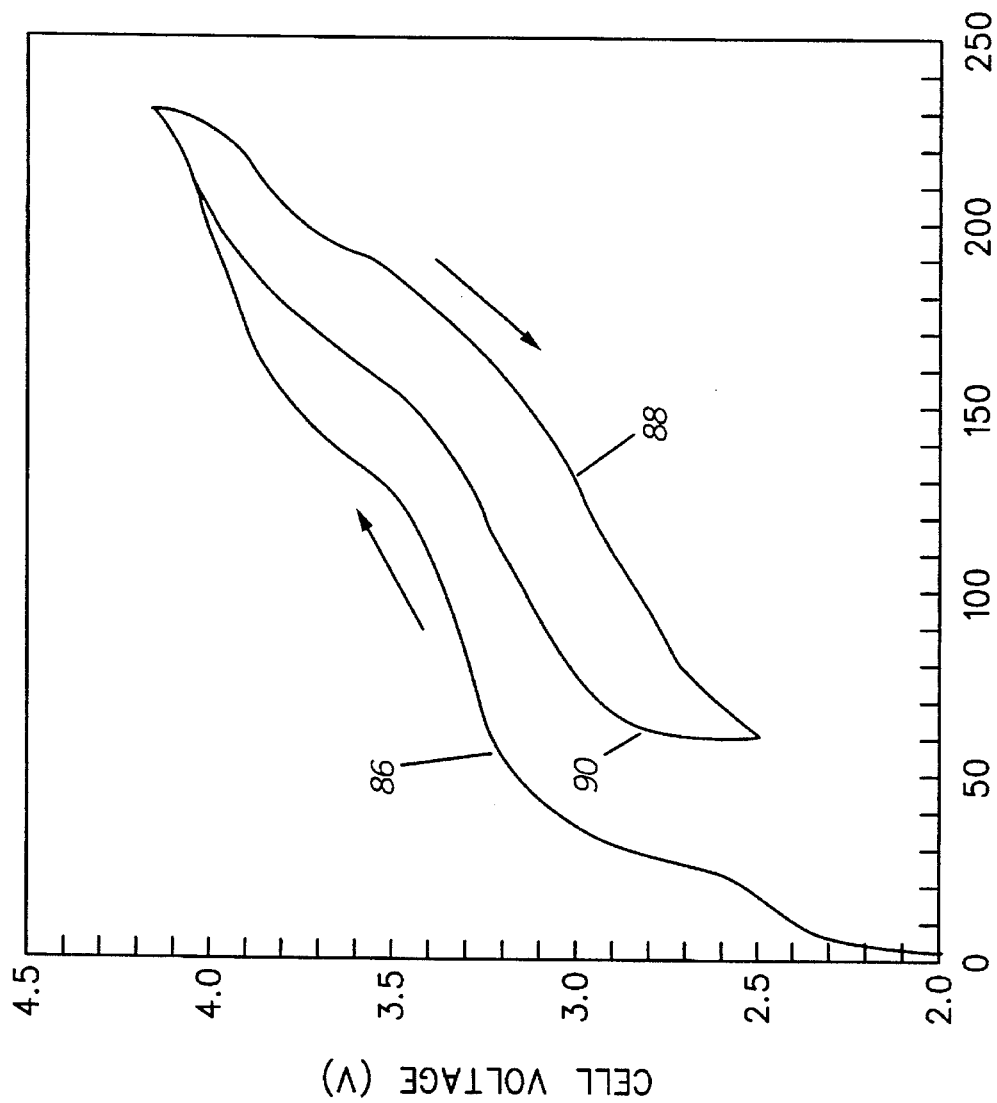
FIG. 4 is a charge and discharge profile for a $LiMnO_2$ electrode vs. graphite, fabricated in accordance with the instant invention.

Referring now to FIG. 4, there is illustrated therein a charge/discharge profile of cell voltage for an electrochemical cell including the LiMnO$_2$ positive electrode fabricated according to the method described hereinabove and a graphite negative electrode. The mass ratio of the positive to the negative was approximately 2.3:1. The first charge is illustrated on line 86, while the first discharge and second charge are shown on line 88 and 90. From a perusal of FIG. 4, it may be appreciated that despite a significant capacity loss due to the graphite electrode, a capacity greater than approximately 150 mAh/g has been obtained. By way of comparison for the same mass ratio, the practical capacity of the positive material would be less than 80 mAh/g if conventional LiCO$_2$ or LiM$_2$O$_4$ is used as the positive material.

Example 2

Providing Mn(OH)$_2$ prepared in a method as described hereinabove in Example 1, such material was then mixed thoroughly with Na$_2$O$_2$ and Li$_2$O$_2$ in the molar ratio: Na: Li: Mn=0.05:0.95:1, in the presence of THF. The mixture was dried at ambient temperatures under vacuum and then heated to approximately 450° C. in a nitrogen atmosphere for approximately 30 hours. The final product had a formula of Li$_{0.95}$Na$_{0.05}$MnO$_2$.

The resulting powder was mixed along with carbon black (10 wt/%) and PTFE (Teflon) powder (5 wt/%) and fabricated into a thin sheet via conventional processing. A 1 cm$^2$ sample having a thickness of approximately 60 microns was cut from the sheet and tested as the positive electrode in a cell with lithium foil as the counterelectrode. The test cell further included a glass mat separator, and a 1M LiPF$_6$ electrolyte in a solution of 50% ethylene carbonate and 50% dimethylcarbonate.

Figure 5:
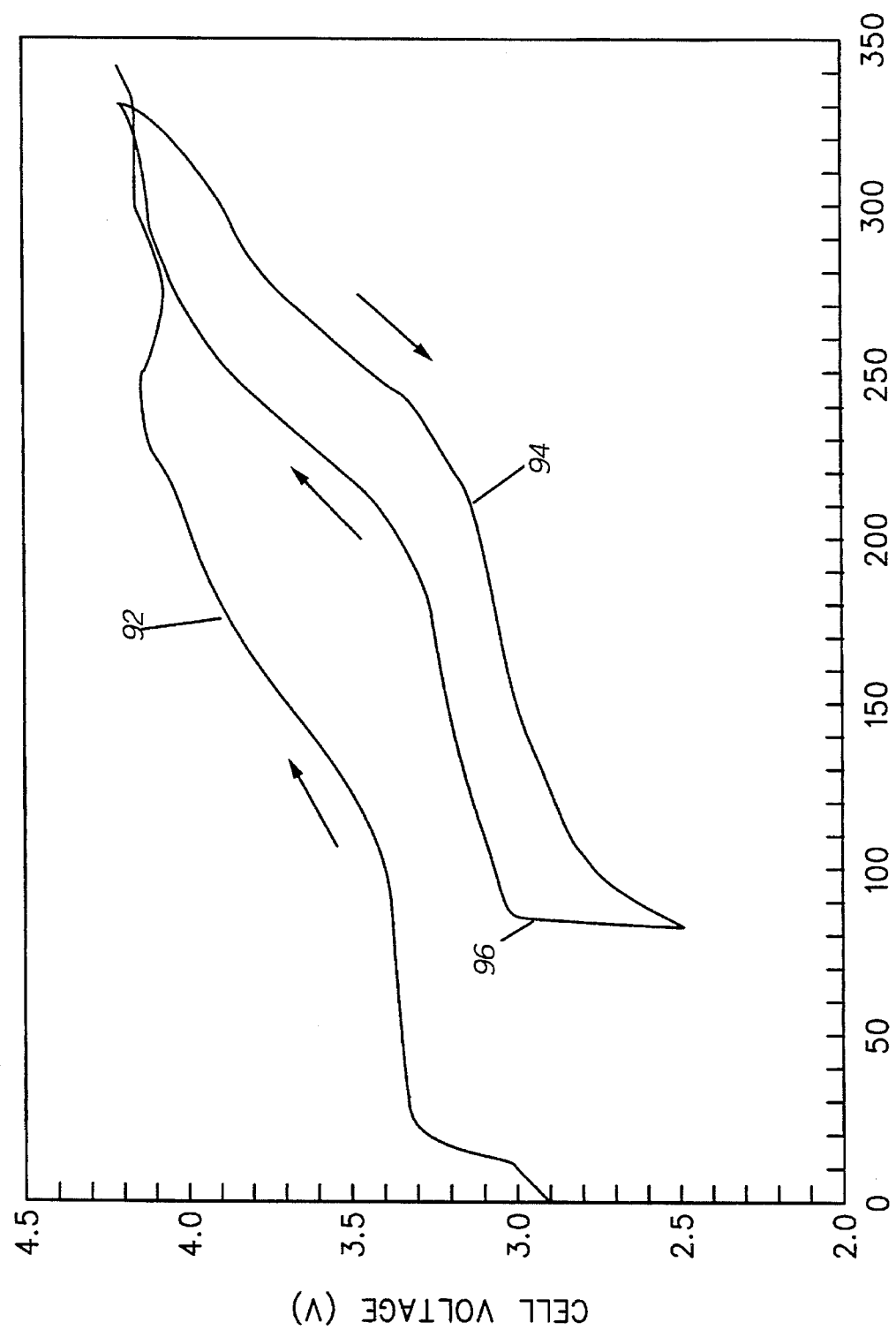
FIG. 5 is a charge and discharge profile for a $Li_{0.95}N_{0.05}$, $MnO_2$ electrode vs. lithium metal, fabricated according to the instant invention.

Referring now to FIG. 5, there is illustrated therein a charge/discharge profile of cell voltage for the material fabricated according to this example. From a perusal of FIG. 5 it may be appreciated that a capacity of as high as 250 mAh/g was obtained. Moreover, cycleability is demonstrated, since the material shows similar characteristics from the first charge 92 to the second charge 96. Line 94 illustrated the first discharge.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating an alkaline metal intercalation, transition metal oxide material of the formula:

$$A_xTMO_2$$

wherein A is an alkaline metal selected from the group of Li, Na, K, and combinations thereof, TM is a transition metal selected from the group of Ti, V, Mn, Cr, Fe, Ni, Co, and combinations thereof, and wherein 0.5≦x≦1.2, said method comprising the steps of:

combining a transition metal hydroxide of the formula TM(OH)$_2$ with an alkaline metal-containing oxidizing agent selected from the group of Li$_2$O$_2$, LiNO$_3$, LiClO$_4$, Na$_2$O$_2$, K$_2$O$_2$, and combinations thereof, in the presence of a liquid organic solvent;

removing said organic solvent to collect a powdered alkaline metal intercalation transition metal oxide material; and calcining said powdered material in an oxygen free, inert gas atmosphere.

2. A method as in claim 1, wherein the step of providing a transition metal hydroxide includes the further steps of:

providing a transition metal containing precursor material in solution;

adding a basic oxidizer to said transition metal containing precursor material solution, said basic oxidizer having the formula AOH, where A is an alkaline metal or NH$_4$—, and where the ratio of transition metal to alkaline metal is approximately 1:2, to form a precipitate; and collecting said precipitate.

3. A method as in claim 2, wherein the step of adding an oxidizing agent includes the further step of adding sufficient oxidizing agent to said solution to have a pH of approximately 10.

4. A method as in claim 2, including the further step of providing LiOH as said basic oxidizer.

5. A method as in claim 1, wherein the transition metal hydroxide is Mn(OH)$_2$.

* * * * *